(12) United States Patent
Oguri et al.

(10) Patent No.: US 6,429,233 B1
(45) Date of Patent: Aug. 6, 2002

(54) METHOD FOR REUSING POLYESTER CHIP

(75) Inventors: Hiroyuki Oguri, Ikoma; Masahiro Matsumoto, Kyoto; Hirotoshi Umemoto, Uji, all of (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/830,371

(22) PCT Filed: Aug. 28, 2000

(86) PCT No.: PCT/JP00/05778

§ 371 (c)(1),
(2), (4) Date: Jul. 23, 2001

(87) PCT Pub. No.: WO01/16208

PCT Pub. Date: Mar. 8, 2001

(30) Foreign Application Priority Data

Aug. 26, 1999 (JP) .......................................... 11-239308
Aug. 26, 1999 (JP) .......................................... 11-239309

(51) Int. Cl.$^7$ ................................................. C08J 11/04
(52) U.S. Cl. ..................... 521/48.5; 528/272; 528/495; 528/501; 528/503; 525/437; 525/444; 521/48
(58) Field of Search ................................ 528/272, 495, 528/501, 503; 525/437, 444; 521/48, 48.5

(56) References Cited

U.S. PATENT DOCUMENTS 5,552,478 A * 9/1996 Fisher ........................ 521/48.5
5,726,277 A * 3/1998 Salsman ..................... 428/480

* cited by examiner

*Primary Examiner*—Samuel A. Acquah
(74) *Attorney, Agent, or Firm*—Connolly Bove Lodge & Hutz

(57) ABSTRACT

This invention relates to a method for recycling a polyester chip which comprises providing a polyester chip (a), polyol (b) and polybasic acid (c), subjecting said (a) and said (b) to transesterification reaction and reacting it with said (c) to give a reconstituted polyester resin, the total number of moles of hydroxyl group being not less than 1.03 times the total number of moles of carboxyl group in the material for the production of said reconstituted polyester resin; and a method for recycling a polyester chip which comprises providing said (a), (b) and (c) and, with the total of (a), (b) and (c), subjecting said (a) and said (c) to transesterification reaction and reacting it with said (b) to give a reconstituted polyester resin, the total number of moles of hydroxyl group being not less than 1.03 times the total number of moles of carboxyl group in the material for the production of said reconstituted polyester resin.

7 Claims, No Drawings

METHOD FOR REUSING POLYESTER CHIP

TECHNICAL FIELD

The present invention relates to a method of recycling a polyester chip derived from the used containers or industrial wastes recovered for resource recycling and to a reconstituted polyester resin as obtainable by the method.

BACKGROUND ART

Heretofore, polyester resins, particularly polyester resins produced by copolymerizing terephthalic acid with diols, have been used in quantities in the manufacture of fiber, film and other shaped articles.

Usually, in various stages of manufacture of polyester fiber, film or other shaped articles, varying amounts of rejects and scraps are inevitably formed. For efficient uses of resources, it is assuming more and more importance to reuse not only said rejects and wastes but also used polyester articles as such. Moreover, the recent upsurge in the recycling movement has caused a dramatic increase in the quantity of poly (ethylene terephthalate) (PET) articles recovered from the domestic refuse and, therefore, the recovery and reuse of them is also getting more and more important.

Several technologies have already been reported on the reuse of said rejects, scraps, and used polyester articles recovered (these will hereinafter be referred to collectively as "recovered polyester"), and Japanese Kokai Publication Hei-6-166747, for instance, discloses a method of producing a reconstituted PET through depolymerization of PET.

The PET reconstituted by the above method tends to have been discolored by the heat applied for depolymerization under high-viscosity condition so that the reconstituted PET can be used only in the manufactured of ordinary fiber and film.

Japanese Kokoku Publication Sho-62-56893 discloses a method of producing a reconstituted polyester resin for the manufacture of medical fibers which comprises utilizing a reconstituted material containing not more than 20 mole % of the polyethylene terephthalate repeating unit for the purpose of overcoming the disadvantage of poor dyeability of polyethylene terephthalate. However, this PET-containing reconstituted polyester resin, which is intended for use as fiber, is not only large in molecular weight and sparingly soluble in solvents but also shows no fluidity over the temperature range from room temperature to at least 190° C., with the result that it is not capable of forming thin films (20 to 60 μm).

Thus, the use for reconstituted resins obtained from recovered polyesters is limited to fiber and film and substantially none of recycled resins can be used as binders for coatings, adhesives, inks and the like.

DISCLOSURE OF THE INVENTION

The object of the invention is to provide a method for recycling a polyester which comprises reusing recovered polyesters to produce a reconstituted polyester resin suitable for use as a binder in coatings, adhesives and inks, among other products.

The inventors of the present invention made extensive investigations for solving the above problem and found a method for producing a reconstituted polyester resin having satisfactory thin-film-forming properties, good fluidity over a broad temperature range from room temperature to 140° C., and a sufficient amount of functional groups to react with a crosslinking agent.

The present invention, therefore, provides a method for recycling a polyester chip which comprises providing a polyester chip (a) whose principal component of polybasic acid is terephthalic acid, a polyol (b) and a polybasic acid (c), with the total of (a), (b) and (c) being taken as 100 weight parts, subjecting 5 to 60 weight parts of said polyester chip (a) and 5 to 40 weight parts of said polyol (b) to transesterification reaction and reacting it with 10 to 60 weight parts of said polybasic acid (c) to give a reconstituted polyester resin having a number average molecular weight of 1000 to 10000, an acid value of 1 to 100, and a hydroxyl value of 30 to 200, the total number of moles of hydroxyl group being not less than 1.03 times the total number of moles of carboxyl group in the material for the production of said reconstituted polyester resin.

The invention further provides a method for recycling a polyester chip which comprises providing a polyester chip (a) whose principal component of polybasic acid is terephthalic acid, a polyol (b) and a polybasic acid (c), with the total of (a), (b) and (c) being taken as 100 weight parts, subjecting 5 to 60 weight parts of said polyester chip (a) and 10 to 60 weight parts of said polybasic acid (c) to transesterification reaction and reacting it with 5 to 40 weight parts of said polyol (b) to give a reconstituted polyester resin having a number average molecular weight of 1000 to 3000, an acid value of 3 to 100, and a hydroxyl value of 30 to 200, the total number of moles of hydroxyl group being not less than 1.03 times the total number of moles of carboxyl group in the material for the production of said reconstituted polyester resin.

The invention further provides a reconstituted polyester resin as obtainable by the above method for recycling a polyester chip.

In the context of the present invention, the terms "polyester chip", "recovered poly(ethylene terephthalate); recovered PET", and "recovered poly(butylene terephthalate)" means the poly(ethylene terephthalate) or poly(butylene terephthalate) derived from containers recovered for recycling and the poly(ethylene terephthalate) or poly(butylene terephthalate) derived from industrial wastes, including crushings of the rejects or scraps formed in various stages of manufacture of polyester products (for example, fiber, film and other shaped articles).

Further, in the context of the invention, the term "reconstituted polyester resin" means the polyester resin synthesized by reusing said "polyester chip".

DETAILED DESCRIPTION OF THE INVENTION

The present invention is now described in detail.

The first aspect of the present invention relates to a method for recycling a polyester chip which comprises providing a polyester chip (a) whose principal component of polybasic acid is terephthalic acid, a polyol (b) and a polybasic acid (c), with the total of (a), (b) and (c) being taken as 100 weight parts, subjecting 5 to 60 weight parts of said polyester chip (a) and 10 to 60 weight parts of said polybasic acid (c) to transesterification reaction and reacting the reaction product further with 5 to 40 weight parts of said polyol (b) to give a reconstituted polyester resin having a number average molecular weight of 1000 to 10000, an acid value of 1 to 100, and a hydroxyl value of 30 to 200, the total number of moles of hydroxyl group being not less than 1.03 times the total number of moles of carboxyl group in the material for the production of said reconstituted polyester resin.

Referring to the amounts of said polyester chip (a), polyol (b) and polybasic acid (c), the values mentioned above are formulating amounts of the respective materials, with the total amount thereof being taken as 100 weight parts.

The subject of recycling in the present invention is said polyester chip (a) containing terephthalic acid as a predominant polybasic acid component. While polyesters are generally prepared from a polybasic acid and a diol, the polyester chip (a) mentioned above is produced by using terephthalic acid as a principal polybasic acid component. The polyester chip (a) may comprise poly(ethylene terephthalate) and/or poly(butylene terephthalate). As will be mentioned later herein, the kinds and proportions of starting materials for said polyester chip (a) must be known in order that the amounts of hydroxyl and carboxyl groups that will be available on hydrolysis may be ascertained.

The polyester chip (a) mentioned above is derived from used fiber, film and other shaped articles and/or the rejects and scraps formed in the manufacture of such articles and is preferably in the form of pellets, chips or crushings not larger than 20 mm square. When the size of polyester chip (a) is not greater than 20 mm, the melting time can be curtailed in the course of production and, moreover, when said pellet or the like form is used, the apparent specific gravity can be increased.

In the method recycling polyester according to the first aspect of the invention, 5 to 60 weight parts of said polyester chip (a) and 5 to 40 weight parts of said polyol (b) are subjected to transesterification reaction. When the amount of said polyester chip (a) is less than 5 weight parts, the reforming effect on the polyester resin to be reused cannot be expected and the resources recycling as the object of the invention cannot be accomplished. On the other hand, when the amount exceeds 60 weight parts, the solubility for solvent is sacrificed a great deal and the fluidity at temperatures below 140° C. is also remarkably reduced so that the product is not suited for use as a binder. The amount of the above polyester chip (a) is preferably 10 to 50 weight parts, more preferably 15 to 40 weight parts.

On the other hand, when the amount of the polyol (b) is smaller than 5 weight parts, the molecular weight of the resulting reconstituted polyester resin is too high to insure sufficient solubility for solvent and fluidity for use of binder or the like and, moreover, it is impossible to introduce a sufficient amount of functional groups to react with a curing agent. Exceeding 40 weight parts is also undesirable, for the amount of the functional groups is too great or the molecular weight will be too small. The preferred proportion of said polyol (b) is 15 to 40 weight parts.

The polyol (b) includes diols, such as ethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanedimethanol, hydroxypivalic acid neopentyl glycol ester, 2-butyl-2-ethyl-1,3-propanediol, 3-methyl-1,5-pentanediol, 2,2,4-trimethylpentanediol, hydrogenated bisphenol A, etc.; and tri- and polyols such as trimethylolpropane, trimethylolethane, glycerol, pentaerythritol, and so on. Furthermore, there may be employed a hydroxy-terminated polyalkadienediol, which may for example be 1,4-polyisoprenediol or 1,2-polybutadienediol, or a hydrogenation product thereof.

Commercially available examples of said hydroxy-terminated polyalkadienediol include Epol (hydrogenated polyisoprenediol, molecular weight 1,860, average degree of polymerization 26, product of Idemitsu Petrochemical), PIP (polyisoprenediol, molecular weight 2,200, average degree of polymerization 34, product of Idemitsu Petrochemical), Polytale HA (hydrogenated polybutadienediol, molecular weight 2,200, average degree of polymerization 39, product of Mitsubishi Chemical), and R-45 HT (polybutanediol, molecular weight 2,270, average degree of polymerization 42, product of Idemitsu Petrochemical), among others.

The above polyol (b) may be used as a mixture of two or more species.

The transesterification reaction between said polyester chip (a) and polyol (b) is carried out by blending said polyester chip (a) and polyol (b) and heating these, whereupon the objective transesterification takes place. In this reaction, an oil component may be used concomitantly. When such an oil component is present in the system, the transesterification between the polyester chip (a) and the oil proceeds in parallel, therefore its use is advantageously acceptable. The formulating amount of such an oil component is preferably 5 to 15 weight parts when it is a fatty acid or 5 to 70 weight parts when it is an oil, both based on 100 weight parts of the total amount of polyester chip (a), polyol (b), polybasic acid (c), and oil component.

As examples of the fatty acid mentioned above, there can be mentioned fatty acids containing 6 to 24 carbon atoms. These fatty acids may be linear or branched, saturated or unsaturated. The preferred are fatty acids containing 12 to 18 carbon atoms. As specific examples, fatty acids derived from castor oil, linseed oil, tung oil, safflower ail, soybean oil, tall oil, coconut oil, palm kernel oil and bran oil can be mentioned. Regarding the oil, those oils composed predominantly of triglycerides of such fatty acids with glycerol can be mentioned, among others.

Further, a transesterification catalyst can be used in a given proportion to the formulating amount of said polyester chip (a), for example, in a proportion of 0.005 to 5 weight %.

The above transesterification catalyst includes various known catalysts such as organotin compounds, e.g. dibutyltin oxide, monobutyltin-2-ethylhexanoate, monobutyltin oxide, etc., antimony trioxide, zinc acetate, manganese acetate, cobalt acetate, calcium acetate, lead acetate, tetrabutyl titanate, tetraisopropyl titanate and so on.

This transesterification reaction is carried out under heating at 220 to 250° C. and the time when lumps of said polyester chips (a) are no longer visually evident and the system has become homogeneous and transparent is regarded as the reaction end-point. The time required for this step is about 20 minutes when the heating temperature is 235° C., for instance.

In the method for recycling a polyester chip according to the first aspect of the invention, the reaction product obtained in the above step is reacted with 10 to 60 weight parts of a polybasic acid (c).

When the proportion of said polybasic acid (c) is smaller than 10 weight parts, the molecular weight of the resulting reconstituted polyester resin is unduly too low. Conversely when it exceeds 60 weight parts, the molecular weight is unduly too high. The preferred proportion of said polybasic acid (c) is 30 to 55 weight parts.

As the above polybasic acid (c), those carboxylic acids and/or acid anhydrides which are generally used in the production of polyester can be employed. As examples of the polybasic acid (c), there can be mentioned aromatic polycarboxylic acids and acid anhydrides, such as phthalic anhydride, isophthalic acid, terephthalic acid, tetrabromophthalic anhydride, tetrachlorophthalic anhydride, etc.; alicyclic polycarboxylic acids and acid anhydrides, such as hexahydrophthalic anhydride, tetrahydrophthalic anhydride, 1,4- and 1,3-cyclohexanedicarboxylic acid, etc.; and aliphatic polycarboxylic acids and acid anhydrides, such as maleic anhydride, fumaric acid, succinic anhydride, adipic acid, sebacic acid, azelaic acid and so on. Provided that it is used in a small amount, a tri- or polycarboxylic acid compound, such as trimellitic anhydride and pyromellitic anhydride, can also be used. These species of polybasic acid (c) may optionally be used in admixture.

In addition to said polybasic acid (c), a compound having both a hydroxyl group(s) and a carboxylic group(s), such as hydroxybenzoic acid, hydroxypivalic acid, 1,2-dihydroxystearic acid, 2,2-dimethylolpropionic acid, 2,2-dimethylolbutanoic acid, 2,2-dimethylolpentanoic acid, 2,2-dimethylolhexanoic acid, 2,2-dimethyloloctanoic acid, etc., or a monocarboxylic acid, such as benzoic acid, t-butylbenzoic acid, etc., may be added in a small proportion of, for example, not more than 10% by weight based on said polybasic acid (c) These may be used in a combination of two or more species.

Furthermore, in addition to said components, a monoepoxide compound, such as Cardura E (trade mark, Shell Chemical), and/or a lactone maybe used in combination with said polyol. The lactone mentioned above is capable of undergoing ring-opening addition to the polyester composed of the polycarboxylic acid with the polyol to form a graft chain and includes but is not limited to β-propiolactone, dimethylpropiolactone, butyrolactone, γ-valerolactone, ε-caprolactone, γ-caprolactone, γ-caprylactone, crotolactone, δ-valerolactone and δ-caprolactone. The most preferred of these is ε-caprolactone. These components can be used in a proportion of 5 to 30% by weight of the material used for the production of reconstituted polyester resin other than the solvent.

Referring, further, to the method for recycling a polyester chip according to the first aspect of the invention, the component materials to be used for the production of reconstituted polyester resin should be formulated in such a manner that the total number of moles of hydroxyl group will be not less than 1.03 times the total number of moles of carboxyl group. If the total number of moles of hydroxyl group is less than 1.03 times the total number of moles of carboxyl group, the reaction time will be unduly protracted and the necessary amount of the functional groups of resin for coating use may not be obtained. Preferably, the total number of moles of hydroxyl group is not less than 1.05 times the total number of moles of carboxyl group. The material for the production of the above reconstituted polyester resin means said polyester chip (a), said polyol (b), said polybasic acid (c), and said optional components, namely said oil component, said compound having both hydroxyl and carboxyl groups, said monocarboxylic acid, said monoepoxide compound, said lactone, and other components. However, the solvent, which is a volatile component, is not reckoned.

The total number of moles of hydroxyl group and that of carboxyl group in the raw material are the values calculated as follows. Referring to said polyester chip (a), the numbers of moles of hydroxyl and carboxyl groups which can be obtained by complete hydrolysis are calculated and regarded as the number of moles of hydroxyl group and that of carboxyl group in the polyester chip (a). For this, it is necessary that the components and formulating amounts thereof in the material used for obtaining the polyester chip (a) are known. Further, as to said polyol (b), said polybasic acid (c), said compound having both hydroxyl and carboxyl groups, and said monocarboxylic acid, the number of moles of hydroxyl group and that of carboxyl group in each of them must be taken into account. Furthermore, the fatty acid, as said oil component, is regarded as being equivalent to said polyol (b) and polybasic acid (c) for the purpose of calculating the number of moles of hydroxyl group and that of carboxyl group. As to said oil, the numbers of moles of hydroxyl and carboxyl groups which should be available on complete hydrolysis are respectively calculated as in the case of polyester chip (a) as the number of moles of hydroxyl group and that of carboxyl group. The monoepoxide compound is assumed to be a compound having one hydroxyl group per molecule and the number of moles of hydroxyl group is calculated. The lactone is assumed to be a compound having one hydroxyl group and one carboxyl group per molecule and the number of moles of hydroxyl group and that of carboxyl group are accordingly calculated. The numbers of moles of hydroxyl group and carboxyl group thus calculated are respectively totaled to arrive at the total number of moles of hydroxyl group and that of carboxyl group in the whole material.

In the method for recycling a polyester chip according to the first aspect of the invention, the reaction between the transesterification product first synthesized and the above polybasic acid (c) is carried out as follows. After the transesterification product is cooled to 200° C. or less, a predeterminated amount of said polybasic acid (c), optionally as well as said oil and other components, and a solvent forming an azeotropic mixture with water, such as xylene, are added and reacted at 200 to 240° C. until the predetermined acid value and viscosity value are obtained. The solvent mentioned above may be added in a proportion of, for examples, 1 to 10% by weight relative to the weight of the reaction mixture composed of said transesterification product, said polybasic acid (c) and optional oil and other components.

The second aspect of the present invention relates to a method for recycling a polyester chip
which comprises providing a polyester chip (a) whose principal component of polybasic acid is terephthalic acid, a polyol (b) and a polybasic acid (c), with the total of (a), (b) and (c) being taken as 100 weight parts,
subjecting 5 to 60 weight parts of said polyester chip (a) and 10 to 60 weight parts of said polybasic acid (c) to transesterification reaction
and reacting the resulting product with 5 to 40 weight parts of said polyol (b) to give a reconstituted polyester resin having a number average molecular weight of 1000 to 10000, an acid value of 1 to 100, and a hydroxyl value of 30 to 200,
the total number of moles of hydroxyl group being not less than 1.03 times the total number of moles of carboxyl group in the material for the production of said reconstituted polyester resin.

In the above reaction, too, the amounts of polyester chip (a), polyol (b) and polybasic acid (c) are the amounts based on 100 weight parts of the total of them.

To the above polyester chip (a), the description given above for the polyester chip (a) in the first aspect of the invention applies equally.

In the method for recycling a polyester chip according to the second aspect of the invention, 5 to 60 weight parts of said polyester chip (a) and 10 to 60 weight parts of said polybasic acid (c) are subjected to transesterification reaction in the first place. If the proportion of said polybasic acid (c) is smaller than 10 weight parts, the molecular weight of the reconstituted polyester resin will be unduly high. If it exceeds 60 weight parts, the molecular weight will be unduly low. The preferred proportion of polybasic acid (c) is 30 to 55 weight parts.

As the above polybasic acid (c), those mentioned by way of example for the corresponding component in the first aspect of the invention can be employed. In the above reaction, a compound having both hydroxyl and carboxyl groups, such as the one mentioned for the first aspect of the invention, or a monocarboxylic acid may be formulated in a small proportion in addition to said polybasic acid (c).

The above polybasic acid (c), these having both hydroxyl and carboxyl groups, and said monocarboxylic acid may each be a mixture of two or more species.

The transesterification reaction between said polyester chip (a) and polybasic acid (c) is carried out by blending said polyester chip (a) and polybasic acid (c) and heating these, where upon the objective transesterification takes place. When an acid anhydride is used as the polybasic acid, it is necessary to concomitantly use a polyol for cleaving the anhydride group to generate the free carboxylic acid. For example, when one mole of phthalic anhydride is used, a polyol containing 0.5 to 1.5 moles of hydroxyl group needs to be used.

For the same reason as mentioned for the transesterification reaction according to the first aspect of the invention, a fatty acid may be used concomitantly in this reaction. The preferred amount of such fatty acid and the kind of fatty acid that can be used are the same as those mentioned for the first aspect of the invention. As to the oil, this component is not used here because it would give an excess of carboxyl group.

In this reaction, too, a transesterification catalyst can be used. The amount and kind of transesterification catalyst may be the same as those mentioned for the first aspect of the invention.

This transesterification reaction is carried out at, for example, 220 to 250° C. and the time when lumps of said polyester chip are no longer visually evident and the system has become homogeneous and transparent is regarded as the reaction end-point. The time required for this reaction step may for example be about 10 to 40 minutes when the heating temperature is 235° C.

In the method for recycling a polyester chip in accordance with the second aspect of the invention, the reaction product thus obtained is further reacted with 5 to 40 weight parts of said polyol (b), optionally as well as said fatty acid.

The above polyol (b) may be the same compound as the polyol (b) mentioned for the first aspect of the invention and this component may be a mixture of two or more species.

In the method for recycling a polyester chip according to the second aspect of the invention, the polyol (b) mentioned above is used in a proportion of 5 to 40 weight parts. If the proportion of said polyol (b) is less than 5 weight parts, the amount of the functional groups in the reconstituted polyester resin will be unduly too small. On the other hand, if it exceeds 40 weight parts, the functional groups will be too much and the molecular weight be unduly low.

In the method for recycling a polyester chip according to the second aspect, too, the monoepoxide compound and lactone can be used concomitantly. The amounts and kinds of monoepoxide compound and lactone may be the same as those mentioned for the first aspect of the invention.

In the method for recycling a polyester chip according to the second aspect of the invention, the above polybasic acid (c) and polyol (b) must be formulated in such proportions that, in the raw material for the production of reconstituted polyester resin, the total number of moles of hydroxyl group will be not less than 1.03 times the total number of carboxyl group, preferably not less than 1.05 times the latter. When the total number of moles of hydroxyl group is less than 1.03 times the total number of moles of carboxyl group, the reaction time is unduly protracted and the resin cannot be provided with a sufficient amount of the functional groups for coating applications. As to the total number of moles of hydroxyl group and that of carboxyl group, the definition given for the first aspect of the invention is applicable.

In the method for recycling a polyester chip according to the second aspect of the invention, the reaction between the above transesterification product and said polyol (b) is carried out as follows. Thus, after the transesterification product is cooled to 200° C. or below, a calculated amount of polyol (b), optionally together with said fatty acid and other components, and a solvent forming an azeotropic mixture with water, such as xylene, are added and the reaction is conducted at 200 to 240° C. until the predetermined acid value and viscosity value are obtained. The solvent mentioned above is preferably used in a proportion of 1 to 10 weight % relative to the weight of the reaction mixture composed of said transesterification product, polybasic acid (c) and optional components.

In accordance with the first aspect or the second aspect of the present invention, a reconstituted polyester resin can be obtained as described above. This reconstituted polyester resin is used as diluted with a predetermined solvent suited to the intended use but the resin characteristic values may for example be as follows: the number average molecular weight 1000 to 10000, preferably 1000 to 3000, the resin acid value 1 to 100, preferably 2 to 50, the OH value 30 to 200, preferably 30 to 150, and the fatty acid content 0 to 70 weight %. The fatty acid content mentioned above means the proportion of fatty acids in the raw material used for production of the reconstituted polyester resin of the invention. When the oil is used, the amount of fatty acids occurring in the oil is included in the calculation. Outside of the above range, the product resin cannot be used successfully as the binder for coatings and the like. Moreover, since the above reconstituted polyester resin has not been heated in high-viscosity state, it has not been discolored, thus being suited for use as a coating binder. Because of the above resin characteristics, the reconstituted polyester resin of the invention is preferably used as, in particular, a resin for coating.

BEST MODE FOR CARRYING OUT THE INVENTION

The following examples are intended to illustrate the invention in further detail and should by no means be construed as defining the scope of the invention.

EXAMPLE 1

A reactor equipped with a heater, stirrer, nitrogen gas inlet tube and fractional distillation apparatus was charged with 25.56 weight parts of 5 $mm^2$ crushings of recovered PET, 13.11 weight parts of trimethylolpropane, 20.48 weight parts of neopentyl glycol, and 0.027 weight part of the transesterification catalyst dibutyltin oxide and the reaction was carried out at 240° C. In 20 minutes after the increase of temperature, lumps of said recovered PET were liquidated. Therefore, the reaction mixture was cooled to 180° C. and 19.92 weight parts of phthalic anhydride, 19.92 weight parts of adipic acid and, for removal of byproduct water, 3 weight %, based on the total charge, of xylene were added and reacted at 220° C. until the acid value of the resin had reached 15. After completion of the reaction, the reaction mixture was cooled and the nonvolatile fraction of the product resin was adjusted to 60% by adding a 8/2 (by volume) mixture of xylene and n-butanol. The reconstituted polyester resin thus obtained had a viscosity of Y, an acid value of 14.5, a hydroxyl value of 100, a weight average molecular weight of 53000 and a number average molecular weight of 1800 as determined by GPC and a fatty acid content of 0 weight %. In the material to be used, the total number of moles of hydroxyl group was 1.18 times the total number of moles of carboxyl group.

EXAMPLE 2

A reactor equipped with a heater, stirrer, nitrogen gas inlet tube and fractional distillation apparatus was charged with 17.0 weight parts of 5 $mm^2$ crushings of recovered PET, 11.9 weight parts of pentaerythritol, 6.3 weight parts of neopentyl glycol, 41.9 weight parts of soybean oil, and 0.02 weight parts of the transesterification catalyst dibutyltin oxide and the reaction was carried out at 240° C. In 20 minutes after the increase of temperature, lumps of recovered PET were liquidated. Therefore, the reaction mixture was cooled to 180° C. and 25.5 weight parts of phthalic anhydride and, for removal of byproduct water, 3 weight %, based on the total charge, of xylene were added and reacted at 230° C. until the acid value of the resin had reached 10. After completion of the reaction, the reaction mixture was cooled and the nonvolatile fraction of the resin was adjusted to 60% by adding a 8/2 (by volume) mixture of xylene and n-butanol. The reconstituted polyester resin thus obtained had a viscosity of Y, an acid value of 9.8, a hydroxyl value of 80, a weight average molecular weight of 51000 and a number average molecular weight of 2000 as determined by GPC, and a fatty acid content of 40 weight %. In the material to be used, the total number of moles of hydroxyl group was 1.19 times the total number of moles of carboxyl group.

The reconstituted polyester resin solutions obtained in Examples 1 and 2 were transparent, substantially colorless fluid liquids with Gardner color numbers of 1 and 3, respectively, thus being suited for use as polyester resins for solvent based coatings.

EXAMPLE 3

A reactor equipped with a heater, stirrer, nitrogen gas inlet tube and fractional distillation apparatus was charged with 24.19 weight parts of 5 $mm^2$ crushings of recovered PET, 24.19 weight parts of adipic acid and 0.03 weight part of the transesterification catalyst dibutyltin oxide and the reaction was carried out at 240° C. In 20 minutes after the increase of temperature, lumps of recovered PET were liquidated. Therefore, the reaction mixture was cooled to 180° C. and 35.00 weight parts of bran fatty acids, 11.43 weight parts of pentaerythritol, 12.94 weight parts of neopentyl glycol and, for removal of byproduct water, 3 weight %, based on the total charge, of xylene were added and reacted at 220° C. until the acid value of the resin had reached 15. After completion of the reaction, the reaction mixture was cooled and the nonvolatile fraction of the product resin was adjusted to 60% by adding a 8/2 (by volume) mixture of xylene and n-butanol. The reconstituted polyester resin thus obtained had a viscosity of Y, an acid value of 14.6, a hydroxyl value of 80, a weight average molecular weight of 55000 and a number average molecular weight of 1800 as determined by GPC, and a fatty acid content of 35 weight %. In the material to be used, the total number of moles of hydroxyl group was 1.18 times the total number of moles of carboxyl group.

EXAMPLE 4

A reactor equipped with a heater, stirrer, nitrogen gas inlet tube and fractional distillation apparatus was charged with 18.1 weight parts of 5 $mm^2$ crushings of recovered PET, 27.1 weight parts of phthalic anhydride, 35.0 weight parts of bran fatty acids, 10.6 weight parts of neopentyl glycol, and 0.02 weight part of the transesterification catalyst dibutyltin oxide and the reaction was carried out at 240° C. In 20 minutes after the increase of temperature, lumps of recovered PET were liquidated. Therefore, the reaction mixture was cooled to 180° C. and 14.3 weight parts of pentaerythritol and, for removal of byproduct water, 3 weight %, based on the total charge, of xylene were added and reacted at 220° C. until the acid value of the resin had reached 15. After completion of the reaction, the reaction mixture was cooled and the nonvolatile fraction of the product resin was adjusted to 60% by adding a 8/2 (by volume) mixture of xylene and n-butanol. The reconstituted polyester resin thus obtained had a viscosity of W, an acid value of 14.8, a hydroxyl value of 80, a weight average molecular weight of 60000 and a number average molecular weight of 1900 as determined by GPC, and a fatty acid content of 35 weight %. In the material to be used, the total number of moles of hydroxyl group was 1.20 times the total number of moles of carboxyl group.

The reconstituted polyester resin solutions obtained in Examples 3 and 4 were transparent, substantially colorless fluid liquids with Gardner color number of 3, respectively, thus being suited for use as polyester resins for solvent based coatings.

Reference Example 1

The same reactor as used in Example 1 was charged with 26.57 weight parts of phthalic anhydride, 37.92 weight parts of soybean fatty acids, 15.29 weight parts of pentaerythritol, 8.84 weight parts of neopentyl glycol, and for removal of byproduct water, 3 weight %, based on the total charge, of xylene and the reaction was carried out at 230° C. until the acid value had reached 10. After cooling, a 8/2 (by volume) mixture of xylene and n-butanol was added to the resin to adjust its nonvolatile fraction to 60%. The polyester resin solution thus obtained showed a viscosity of X, an acid value of 9.5, a weight average molecular weight of 52000 and a number average molecular weight of 1950 as determined by GPC, and a fatty acid content of 45 weight %. In the material to be used, the total number of moles of hydroxyl group was 1.22 times the total number of moles of carboxyl group. The resulting polyester resin solution was a transparent, substantially colorless fluid liquid with a Gardner color number of 4 and had characteristics equivalent to those of the reconstituted polyester resin solutions obtained in Examples 1 to 4 of the invention.

INDUSTRIAL APPLICABILITY

The present invention provides a method for facilitated recycling of resources, particularly recycling of polyester chips whose principal component of polybasic acid is terephthalic acid as derived from used containers and industrial wastes as a reconstituted polyester resin without requiring special equipment. By this method, reconstituted polyester resins which have heretofore been restricted in use can be exploited as a binder for coatings and the like.

Since, in the present invention, small-sized polyester chips are used, the melting time of the polyester prior to depolymerization can be significantly curtailed and the production efficiency can also be improved. Furthermore, troubles such as the charring or yellowing of the material due to overheating in the melting stage can be avoided.

In addition, the reconstituted polyester resin according to the invention is possessed of defined resin characteristic values and suitable for use as a binder for coatings and other products.

What is claimed is:

1. A method for recycling a polyester chip which comprises providing a polyester chip (a) whose principal component of polybasic acid is terephthalic acid, a polyol (b) and a polybasic acid (c), with the total of (a), (b) and (c) being taken as 100 weight parts, subjecting 5 to 60 weight parts of said polyester chip (a) and 5 to 40 weight parts of said polyol (b) to transesterification reaction and reacting it with 10 to 60 weight parts of said polybasic acid (c) to give a reconstituted polyester resin having a number average molecular weight of 1000 to 10000, an acid value of 1 to 100, and a hydroxyl value of 30 to 200, the total number of moles of hydroxyl group being not less than 1.03 times the total number of moles of carboxyl group in the material for the production of said reconstituted polyester resin.

2. A method for recycling a polyester chip which comprises providing a polyester chip (a) whose principal component of polybasic acid is terephthalic acid, a polyol (b) and a polybasic acid (c), with the total of (a), (b) and (c) being taken as 100 weight parts, subjecting 5 to 60 weight parts of said polyester chip (a) and 10 to 60 weight parts of said polybasic acid (c) to transesterification reaction and reacting it with 5 to 40 weight parts of said polyol (b) to give a reconstituted polyester resin having a number average molecular weight of 1000 to 10000, an acid value of 1 to 100, and a hydroxyl value of 30 to 200, the total number of moles of hydroxyl group being not less than 1.03 times the total number of moles of carboxyl group in the material for the production of said reconstituted polyester resin.

3. The method for recycling a polyester chip according to claim 1 wherein the polyester chip (a) whose principal component of polybasic acid is terephthalic acid comprises poly(ethylene terephthalate) and/or poly(butylene terephthalate).

4. A reconstituted polyester resin as obtainable by the method of recycling a polyester chip according to claim 1.

5. The method for recycling a polyester chip according to claim 2 wherein the polyester chip (a) whose principal component of polybasic acid is terephthalic acid comprises poly(ethylene terephthalate) and/or poly(butylene terephthalate).

6. A reconstituted polyester resin as obtainable by the method of recycling a polyester chip according to claim 2.

7. A reconstituted polyester resin as obtainable by the method of recycling a polyester chip according to claim 3.

* * * * *